United States Patent Office 3,271,407
Patented Sept. 6, 1966

3,271,407
CERTAIN ISOTHIAZOLYLACETIC ACID COMPOUNDS
Rintje Raap, Raymond Urgel Lemieux, and Ronald George Micetich, Edmonton, Alberta, Canada, assignors to R & L Molecular Research Ltd., Edmonton, Alberta, Canada, a corporation of Canada
No Drawing. Filed June 28, 1965, Ser. No. 467,703
10 Claims. (Cl. 260—302)

This invention relates to novel compounds. More particularly, this invention relates to novel compounds which are useful as intermediates in the preparation of therapeutically active penicillins and cephalosporins, and to processes for preparing such compounds.

It is an object of the present invention to provide a new class of chemical intermediates which can be easily converted to penicillins and cephalosporins and other therapeutically useful substances. It is another object of the present invention to provide a novel process for the preparation of the novel compounds.

These and other objects which may appear as the specification proceeds are achieved by this invention which comprises the provision of compounds selected from the group consisting of compounds having the following formula (I)

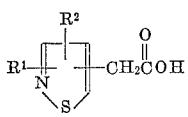

wherein $R^1$ and $R^2$ each represent a member selected from the group consisting of hydrogen, chloro, bromo, iodo and methyl.

The preferred compounds of the present invention have the formula (II)

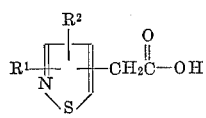

wherein $R^1$ and $R^2$ each represent hydrogen and methyl.

Penicillins, e.g., 6-(isothiazol-5-yl-acetamido)-penicillanic acid and cephalosporins, e.g., 7-(isothiazol-5-yl-acetamido)cephalosporanic acid are prepared from the novel acetic acids of this invention by reaction of 6-amino-penicillanic acid (6-APA) and 7-aminocephalosporanic acid (7-ACA) respectively, preferably in the form of a neutral salt such as the sodium salt or the triethylamine salt with an active ester, e.g., 2,4-dinitrophenyl ester or the p-nitrophenyl ester of an acid of Formula I, or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid of alkyl and aryl sulfonic acids and of more hindered acids such as diphenyl-acetic acid. In addition, an acid azide or active thioester (e.g., with thiophenol, thioacetic acid) may be used or the free acid itself may be coupled with 6-APA or 7-ACA by the use of enzymes or of a carbodiimide reagent [cf. Sheehan and Hess, J. Amer. Chem. Soc. 77, 1067 (1955)]. Another equivalent of the 2,4-dinitrophenyl and p-nitrophenyl esters is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. The methods for carrying out these reactions to produce a penicillin or a cephalosporin and the methods used to isolate the penicillin or cephalosporin so-produced are well known in the art.

The novel isothiazolylacetic acids of the present invention having the formula (III)

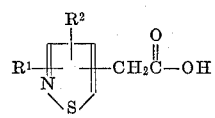

wherein $R^1$ and $R^2$ have the meaning set forth above, are preferably prepared as described and exemplified below from the corresponding isothiazole carboxylic acids or from the corresponding methylisothiazoles. Various isothiazoles, isothiazole carboxylic acids and/or methylisothiazoles and methods for the preparation thereof are described by Caton et al., J. Chem. Soc., 446 (1964); Hübenett et al., Angew Chem., international edition 2, 714 (1963); Buttimore et al., J. Chem. Soc., 2032 (1963); Adams et al., J. Chem. Soc., 3061 (1959); Wille et al., Angew Chem., international edition 1, 335 (1962); Goerdeler et al., Chem. Ber., 94, 2950 (1961); and United States Patent No. 2,839,529 and British Patent No. 984,811.

The isothiazolylacetic acids are prepared from the corresponding isothiazole carboxylic acids according to the following reaction scheme:

$$R^1\!-\!\!\underset{\underset{S}{N}}{\overset{R^2}{\bigcirc}}\!\!-\!COOH \xrightarrow{SOCl_2} R^1\!-\!\!\underset{\underset{S}{N}}{\overset{R^2}{\bigcirc}}\!\!-\!COCl \xrightarrow{CH_2N_2}$$

$$R^1\!-\!\!\underset{\underset{S}{N}}{\overset{R^2}{\bigcirc}}\!\!-\!COCHN_2 \xrightarrow{Ag_2O/CH_3OH}$$

$$R^1\!-\!\!\underset{\underset{S}{N}}{\overset{R^2}{\bigcirc}}\!\!-\!CH_2COOCH_3 \xrightarrow[2.\ H_3O^{\oplus}]{1.\ NaOH/CH_3OH}$$

$$R^1\!-\!\!\underset{\underset{S}{N}}{\overset{R^2}{\bigcirc}}\!\!-\!CH_2COOH$$

wherein $R^1$ and $R^2$ have the meaning set forth above.

In this process, an isothiazole carboxylic acid is reacted with thionyl chloride preferably at reflux temperature to form the acid chloride. Reaction of the acid chloride with diazomethane solution, e.g., an ethereal solution, preferably at about room temperature gives the diazomethylketone. The diazomethylketone is converted to the acetate by heating with an alcohol, e.g. methanol and ethanol, in the presence of silver oxide. The acetate is hydrolyzed to isothiazolylacetic acid by treating with an alcoholic solution of a strong base, e.g., sodium hydroxide in methanol preferably at room temperature and then acidifying with a strong acid, e.g., hydrochloric acid.

When methylisothiazoles are used to prepare the isothiazolylacetic acids, the reaction scheme is as follows:

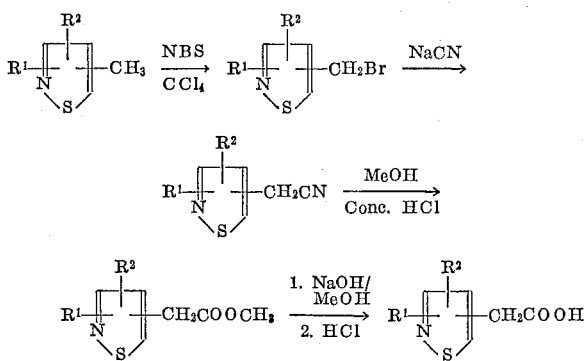

wherein $R^1$ and $R^2$ are each hydrogen, chloro, bromo, or iodo. Obviously where either or both of $R^1$ and $R^2$ is methyl, the first described method should be used.

In this process, a methylisothiazole is halogenated with a halogen radical source, e.g., N-bromosuccinimide (NBS) or N-chlorosuccinimide, in the presence of a non-reactive solvent such as carbon tetrachloride and preferably at reflux temperature and in the presence of an initiator, e.g., benzoyl peroxide or irradiation to produce a halomethylisothiazole, preferably a bromomethylisothiazole. Treatment of this compound with an alkali metal cyanide in the presence of a solvent, e.g., methanol-water, gives a mixture of the cyanide and the amide. The mixture is heated at reflux temperature with a strong acid, e.g., concentrated hydrochloric acid, and an alcohol, e.g., methanol or ethanol, to form the acetate. Hydrolysis of the acetate by treatment with an alcoholic solution of a strong base, e.g., sodium hydroxide in methanol, preferably at room temperature, followed by acidification with a strong acid, e.g., hydrochloric acid, produces the isothiazole carboxylic acid.

Alternatively, the isothiazolylacetic acids of this invention may be prepared from isothiazole lithium compounds [described by Caton et al., J. Chem. Soc., 446 (1964)] by the various reaction schemes which are described below:

(1) Reaction of isothiazole lithium with formaldehyde to give isothiazolylmethyl alcohol and then treatment with a halo acid, e.g., hydrochloric, hydrobromic or hydriodic, to form a halomethylisothiazole. The subsequent procedure whereby the acid is obtained is identical to that described for the preparation of isothiazole acetic acids from methylisothiazoles.

(2) Ethoxylation of isothiazole lithium with ethylene oxide to give isothiazolylethyl alcohol and subsequent oxidation to the acid.

(3) Reaction of isothiazole lithium with a haloacetate to form an isothiazolylacetate and subsequent hydrolysis to the acid.

(4) Reaction of isothiazole lithium with a dialkoxyethylhalide to form diakoxyethylisothiazole; acidification with dilute acid to form the aldehyde; followed by oxidation to the acid.

(5) Reaction of isothiazole lithium with allyl halide to form allylisothiazole and then oxidation to the acid.

(6) Reaction of isothiazole lithium with dimethylformamide to give formylisothiazole [reaction described by Caton et al., J. Chem. Soc., 446 (1964)] followed by condensation with rhodanine to give isothiazolylrhodanine. The isothiazolylrhodanine is cleaved with alkali, e.g., sodium hydroxide, to give isothiazolyl α-thioketopropionic acid, which in turn is converted to the oximino acid with ammonium hydroxide. Decarboxylation and dehydration with acetic anhydride produces the cyanomethylisothiazole which is converted to the acid by the procedure described in connection with the preparation of isothiazolylacetic acids from methylisothiazole. This general procedure is described by Plucker et al., J. Amer. Chem. Soc., 62, 1512 (1940).

(7) Reaction of isothiazole lithium with dimethylformamide to give formylisothiazole followed by reaction with cyanide to give the cyanohydrin. Hydrolysis of the cyanohydrin gives isothiazolylglycolic acid which is reduced, e.g. hydroiodic acid and red phosphorus, to give the acid.

(8) Reaction of isothiazole lithium with dialkyl oxalate to form the alkyl isothiazolylglyoxylate followed by hydrolysis to isothiazolylglyoxylic acid and reduction, e.g. Wolff-Kishner and Clemmensen reductions, gives the acid.

(9) Reaction of isothiazole lithium with chloral followed by alkaline hydrolysis and acidification gives isothiazolylglycolic acid which is reduced to give the acid.

In the foregoing reaction schemes, instead of the lithium compound, the isothiazole sodium or potassium pounds or the corresponding Grignard compound, e.g., isothiazole magnesium chloride, bromide or iodide (prepared by reaction of chloro, bromo or iodo isothiazole with magnesium), can be used.

Additional procedures for the preparation of isothiazolylacetic acid are as follows:

(10) Photolysis of alkyl diazoacetate in the presence of isothiazole gives, by insertion of the carboalkoxycarbene, the alkyl ester of the acid which on hydrolysis gives the acid.

(11) Reaction of acetylisothiazole with an aqueous solution of yellow ammonium polysulfide at an elevated temperature (Willgerodt reaction) to form isothiazolylacetamide together with ammonium isothiazolylacetate followed by acid hydrolysis gives the acid.

(12) Reaction of halomethylisothiazole (preparation described above) with magnesium to form corresponding Grignard compound followed by treatment with carbon dioxide gives the acid.

(13) Conversion of isothiazole carboxylic acid to the acetic acid according to the Arndt-Eistert Synthesis, or treatment of isothiazole carboxylic acid with lithium aluminum hydride to give isothiazolylmethyl alcohol, and subsequent conversion of the alcohol to the acid according to the procedure described in Scheme 12 above.

(14) Reaction of haloisothiazole with sodium dicyanomethane or sodium dialkylmalonate, e.g., sodium diethylmalonate, to give the corresponding dicyanomethylisothiazole or dicarbalkoxymethylisothiazole followed by acid hydrolysis to the acid.

The following examples will serve to illustrate this invention without limiting it thereto. All temperatures are in degrees centigrade.

Example 1.—Preparation of isothiazol-3-yl-acetic acid

The synthesis of this acid is illustrated by the following scheme:

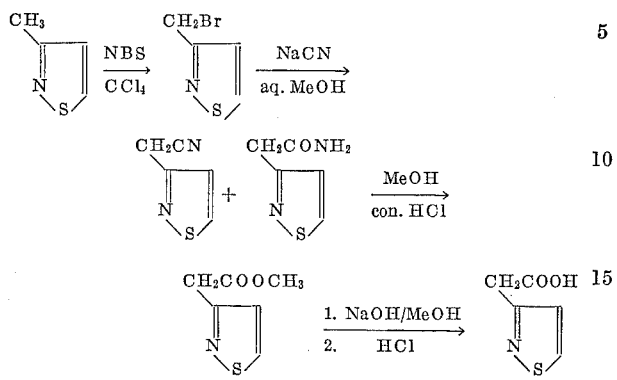

*3-bromomethylisothiazole.* — 3-methylisothiazole (9.9 g., 0.10 mole) and N-bromosuccinimide (18 g., 0.10 mole) in dry carbon tetrachloride (250 ml.) were heated with vigorous stirring under reflux with exposure to a 750 watt lamp for 5–6 hours, at which time all the N-bromosuccinimide had been consumed. Succinimide was removed by filtration and the filtrate was concentrated on a steam bath. The residue was then subjected to fractional distillation in vacuo to give 7 g. (40%) of 3-bromomethylisothiazole, B.P. 58–60° (1.5 mm.).

*3-cyanomethylisothiazole and 3-carboxamidomethylisothiazole.*—3-bromomethylisothiazole (22 g., 0.13 mole), sodium cyanide (9.8 g., 0.20 mole), methanol (60 ml.) and water (60 ml.) were heated under reflux for 5–6 hours, during which time the solution had attained a deep red color. After most of the methanol had been removed under reduced pressure the solution was saturated with salt and continuously extracted with ethyl acetate for 24 hours. The ethyl acetate solution was dried over magnesium sulfate and filtered. Removal of the solvent yielded 13.5 g. of a yellow semisolid, a mixture of cyanide and amide as indicated by the infrared spectrum. Separation could be effected by washing with cold benzene, in which the cyanide dissolved and was recovered as an oil (7.0 g.) by removal of the solvent. The amide could be recrystallized from ethyl acetate-hexane to give long white needles (4.1 g.), M.P. 123–127°.

The crude mixture of cyanide and amide could be used as such in the preparation of methyl isothiazol-3-yl-acetate.

*Methyl isothiazole-3-yl-acetate.*—The mixture of cyanide and amide (16.5 g.) was heated under reflux for 4 hours with concentrated hydrochloric acid (50 ml.) and methanol (100 ml.). The methanol was removed under reduced pressure, the solution saturated with salt and extracted with ether (6×100 ml.). The combined ether extracts were dried over magnesium sulfate and filtered. The ether was removed and the residue distilled in vacuo to give 13 g. of methyl isothiazol-3-yl-acetate, B.P. 108–110° (6 mm.).

*Isothiazol-3-yl-acetate acid.*—Methyl isothiazol-3-yl-acetate (12.5 g.) was dissolved in methanol (15 ml.) and a solution of 3 N sodium hydroxide in methanol (30 ml.) was added with swirling. The color of the solution went from yellow to dark red. The solution was left overnight at room temperature and then concentrated in vacuo to a thick red wax. Excess dry ether was added with scratching and the sodium salt separated as fine pink needles. These were filtered, washed with dry ether and dried by suction. The salt was dissolved in ice water (100 ml.) and acidified with concentrated hydrochloric acid (8 ml.). The mixture was saturated with salt and extracted with ethyl acetate (5×100 ml.). The dried (MgSO₄) ethyl acetate extracts were filtered and the solvent was removed. The residue was recrystallized from ethyl acetate-hexane and 8.2 g. (71%) of isothiazol-3-yl-acetic acid was obtained as white needles, M.P. 130–132° (dec.).

The structural assignment of this acid was confirmed by the neutralization equivalent, the infrared spectrum and the nuclear magnetic resonance absorption spectrum.

Example 2.—Preparation of isothiazol-4-yl-acetic acid

The synthesis of this acid is schematically represented by:

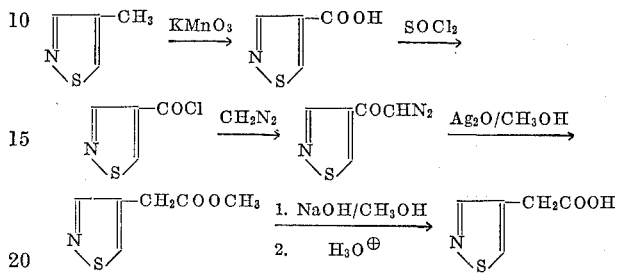

*Isothiazole-4-carboxylic acid.*—4-methylisothiazole (22 g.), sodium carbonate (72 g.) and water (1 litre) were stirred vigorously and heated under reflux. An aqueous solution of potassium permanganate (300 g. in 2 litre) was added rapidly and the mixture was heated for an additional 20 minutes. The precipitated manganese dioxide was filtered and washed with hot water (4×100 ml.). The aqueous layer was extracted with ether (3×200 ml.) and carefully acidified with concentrated sulfuric acid to pH 1. The mixture was saturated with salt and continuously extracted with ether for 48 hours. The ether solution was dried (MgSO₄), filtered and the solvent removed under reduced pressure to give 6.0 g. (20%) yield of isothiazole-4-carboxylic acid. A portion was recrystallized from ethyl acetate-hexane and melted at 162–164°.

*Isothiazole-4-carbonyl chloride.*—Crude isothiazole-4-carboxylic acid (6.0 g.) and thionyl chloride (70 ml.) were heated under reflux for two and one half hours, whereafter the excess of thionyl chloride was removed under reduced pressure. Distillation of the residue in vacuo gave 3 g. (44%) yield of isothiazole-4-carbonyl chloride, B.P. 73–74° (5 mm.).

*Isothiazole-4-diazomethylketone.*—The acid chloride (3 g.) was added slowly to an ice-cold solution of diazomethane in ether (0.2 M, 300 ml.) and the solution was left at room temperature overnight. Ether and excess diazomethane were removed under reduced pressure and the red-brown residue was recrystallized from benzene-hexane to give 1.9 g. (57%) of fine yellow needles, M.P. 57–59°, with the expected infrared spectrum.

*Methyl isothiazol-4-yl-acetate.*—The diazoketone (1.9 g.), silver oxide (0.2 g.) and absolute methanol (25 ml.) were heated under reflux. Periodically small portions of silver oxide were added. The extent of the reaction was followed by the disappearance of the diazo band and the emergence of the ester carbonyl band in the infrared absorption spectrum of the mixture. After 3 hours the reaction was complete and the methanol was removed under reduced pressure. The residue was shaken with dry ether and filtered. The ether filtrate was washed with 2 N hydrochloric acid (10 ml.) and saturated aqueous sodium chloride (2×10 ml.). Next it was dried over magnesium sulfate with decolorizing charcoal. The mixture was filtered and the ether removed. A pale yellow oil (1.4 g.) with the expected infrared absorption spectrum was obtained.

*Isothiazol-4-yl-acetic acid.*—Methyl isothiazol-4-yl-acetate (1.4 g.) was dissolved in methanol (15 ml.) and a solution of 3 N sodium hydroxide in methanol (3.4 ml.) was added with swirling. The color of the solution went from yellow to dark red. The solution was left overnight at room temperature and then concentrated in vacuo to a thick red wax. Excess dry ether was added with scratching and the sodium salt separated as fine pink needles.

These were filtered, washed with dry ether and dried by suction. The salt was dissolved in ice water (15 ml.) and acidified with concentrated hydrochloric acid (1 ml.). The mixture was saturated with salt and extracted with ethyl acetate (5×100 ml.). The dried (MgSO$_4$) ethyl acetate extracts were filtered and the solvent was removed. The residue was recrystallized from ethyl acetate-hexane and 1.2 g. (94%) yield of isothiazol-4-yl-acetic acid was obtained as white needles, M.P. 117–119°(dec.).

The structural assignment of this acid was confirmed by the neutralization equivalent, the infrared spectrum and the nuclear magnetic resonance absorption spectrum.

*Example 3.—Preparation of isothiazol-5-yl-acetic acid*

The synthesis of this compound is illustrated by the following scheme:

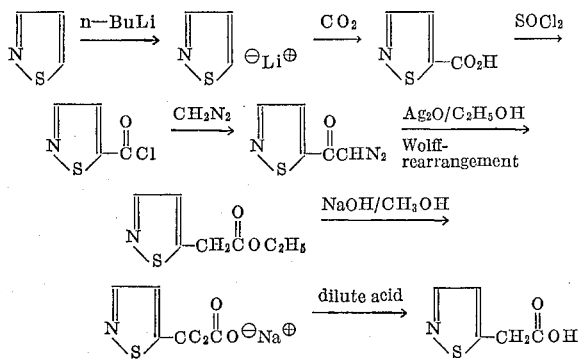

*Isothiazole-5-carboxylic acid.*—This compound was prepared by reacting isothiazolyllithium with solid carbon dioxide, following the directions of Caton, Jones, Slack and Wooldridge, J. Chem. Soc., 446 (1964). The acid, M.P. 196–200°(dec.) was recrystallized from ethyl acetate and obtained in a 61% yield.

*Isothiazole-5-carbonyl chloride.*—Isothiazole-5-carboxylic acid (11.8 g., 0.092 mole) and freshly distilled thionyl chloride (50 ml.) were heated under reflux for 1.5 hours. The excess thionyl chloride was removed on a rotary evaporator and the residue distilled in vacuo to give 10.8 g. (80%) of colorless liquid, B.P. 56–58° (5 mm.), with the expected infrared spectrum.

*Isothiazole - 5 - diazomethylketone.*—A solution of isothiazole-5-carbonyl chloride (9.4 g., 0.064 mole) in 20 ml. of ether was added dropwise to 455 ml. of a 0.29 molar ethereal diazomethane solution (0.131 mole diazomethane) cooled in ice. A rapid reaction took place as was apparent by the rapid evolution of nitrogen and the color change of the ethereal solution from yellow to reddish-brown. After the addition of the acid chloride was completed (in approximately 30 minutes) the solution was allowed to come to room temperature in 30 minutes. Removal of the ether on a rotary evaporator left a reddish-brown solid residue, which was twice recrystallized from a benzene-petroleum ether mixture to 5.9 g. (60%) of colored crystals, M.P. 75–78°. The infrared spectrum contained a strong band at 2100 cm.$^{-1}$, characteristic for diazocarbonyl compounds.

*Ethyl isothiazol-5-yl-acetate.*—Isothiazole-5-diazomethylketone (5.7 g., 0.037 mole) and absolute ethanol (35 ml.) were heated under reflux, with magnetic stirring, in a 300 ml. round-bottom flask (the inside of which had been coated with a silver mirror). A small amount (approximately 0.3 g.) of freshly prepared silver oxide was added. This resulted in an immediate evolution of gas. This gas evolution ceased after 10–15 minutes and the addition of some more silver oxide was required. The extent of the reaction could be followed by the disappearance in the infrared spectrum of the diazo band at 2100 cm.$^{-1}$ and the appearance of an ester carbonyl band at 1740 cm.$^{-1}$. The reaction was completed after 2.5 hours heating under reflux, and a total amount of approximately 3.0 g. of silver oxide was added during this reflux period. The ethanol was removed on a rotary evaporator. Ether (100 ml.) was added to the residue and the suspended solid material was filtered off. The intensely red colored ether solution was washed with one N hydrochloric acid (30 ml.), whereafter it was dried over magnesium sulfate with some decolorizing carbon. The mixture was filtered and the ether removed on a rotary evaporator. The residue was distilled in vacuo to give 3.8 g. (60%) of colorless liquid, B.P. 95–96° (2 mm.), with the expected infrared spectrum.

*Isothiazol-5-yl-acetic acid.*—Eight ml. of 3 N methanolic sodium hydroxide was added to a solution of ethyl isothiazol-5-yl-acetate (3.3 g., 0.019 mole) in methanol (5 ml.). The solution became an intense red color and some heat was evolved. The mixture was left at room temperature for one hour during which the sodium salt of isothiazol-5-yl-acetic acid slowly crystallized from the solution. The remainder of the salt was precipitated by the addition of ether (75 ml.). The somewhat brownish colored salt was filtered off and amounted to 3.2 g. It was dissolved in water (25 ml.) followed by the addition of 3 N aqueous sulfuric acid (10 ml.). Isothiazol-5-yl-acetic acid precipitated immediately and was taken up in ethyl acetate (100 ml.). The aqueous layer was extracted with an additional amount of ethyl acetate (25 ml.). The combined ethyl acetate solutions were dried over magnesium sulfate with some decolorizing carbon. The mixture was filtered and the filtrate was concentrated on a rotary evaporator to a volume of approximately 50 ml., whereafter it was cooled in ice. The product, that crystallized readily from the solution, was collected by filtration. Yield: 2.1 g. (76%) of almost white crystals, M.P. 153–155°(dec.). The neutralization equivalent, the infrared spectrum and the nuclear magnetic resonance spectrum fully agreed with the expected structure.

*Example 4.—Preparation of 4-chloroisothiazol-3-yl-acetic acid*

The synthesis of this acid is illustrated by the following reaction scheme:

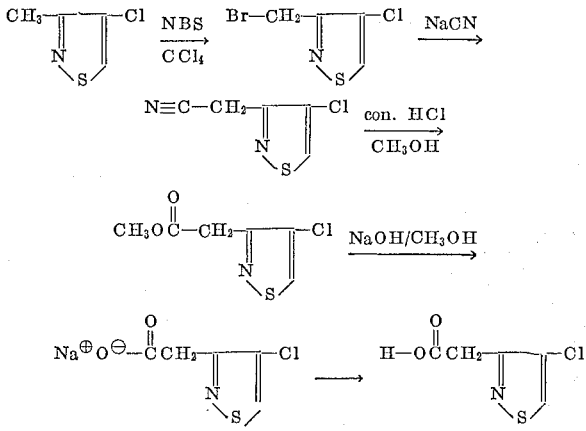

*4 - chloro - 3 - bromomethylisothiazole.*—4 - chloro - 3-methylisothiazole (21.9 g., 0.164 mole), N-bromosuccinimide (29.2 g., 0.164 mole) and benzoyl peroxide (1 g.) in carbon tetrachloride (150 ml.) wrere heated under reflux with exposure to a 750 watt lamp for 10 hours. The succinimide was filtered off and the solvent removed under reduced pressure. The residue was dissolved in ether and washed with a 5% aqueous sodium bicarbonate solution. The residue obtained after drying and removal of the ether was fractionally distilled in vacuo. There was obtained 16.8 g. (48%) of 4-chloro-3-bromomethylisothiazole, B.P. 67–79° (0.5 mm.).

*4 - chloro-3-cyanomethylisothiazole.*—Sodium cyanide (5.6 g., 0.115 mole) was added in portions to a stirred mixture of 4 - chloro - 3 - bromomethylisothiazole (16.7 g., 0.0785 mole) and dimethylsulfoxide (25 ml.). The exothermic reaction necessitated some cooling. When the mixture solidified almost completely, the remaining sodium cyanide was all added at once. An additional 10 ml. of dimethylsulfoxide was added and the mixture was heated in a water bath at 40–50° for 4 hours. The reaction mixture was poured into ice water (100 ml.) and the organic material was extracted with methylene chloride (3×50 ml.). The combined organic extracts were washed successively with 6 N hydrochloric acid (2x) and 5% aqueous sodium bicarbonate (1x). The methylene chloride solution was dried over magnesium sulfate with decolorizing carbon and filtered to give a red colored filtrate. The solvent was removed and the residue distilled in vacuo to give 6.4 g. of crude product, B.P. 95–107° (1 mm.). This partly solidified material was taken up in ether (10 ml.) followed by the addition of petroleum ether which caused a white solid to precipitate. The mixture was cooled and the solid collected by filtration; yield 3.9 g. (32%); M.P. 38–40°. The infrared spectrum agreed with the expected structure.

*Methyl 4-chloroisothiazol-3-yl-acetate.*—A mixture of 4 - chloro - 3 - cyanomethylisothiazole (3.5 g., 0.022 mole), methanol (25 ml.) and concentrated hydrochloric acid (15 ml.) was heated under reflux for 18 hours, whereafter most of the methanol was removed on a rotary evaporator. The organic material was taken up in methylene chloride and the aqueous layer once more extracted with some methylene chloride. The combined methylene chloride solutions were dried over mangesium sulfate with some decolorizing carbon, followed by filtration. The solvent was removed and the almost colorless liquid residue distilled in vacuo to give 2.7 g. (65%) of colorless liquid, B.P. 83–88° (0.5 mm.). The infrared spectrum agreed with the expected structure.

*4-chloroisothiazol-3-yl-acetic acid.*—Methyl 4-chloroisothiazol-3-yl-acetate (2.65 g., 0.0133 mole) was dissolved in methanol (6 ml.) and the resulting solution was treated with 3 N methanolic sodium hydroxide (7 ml.). The sodium salt of the required acid readily crystallized. The mixture was left at room temperature for one hour, then most of the methanol was removed and ether (75 ml.) was added to the residue. The sodium salt was filtered off and amounted to 2.35 g. (88%). The sodium salt (2.2 g., 0.011 mole) was dissolved in water (30 ml.) and this solution was acidified with 3 N aqueous sulfuric acid. The product slowly crystallized from the solution in fine white needles. The mixture was cooled and the crystals collected by filtration. The acid, M.P. 109–110.5°, was finally dried in vacuo over phosphorous pentoxide and amounted to 1.6 g. (72%, based on ester). The infrared spectrum, neutralization equivalent and nuclear magnetic resonance spectrum fully agreed with the expected structure.

*Example 5.—Preparation of 4-bromoisothiazol-3-yl-acetic acid*

4 - bromo - 3 - bromomethylisothiazole.—4 - bromo-3-methylisothiazole (19.9 g., 0.112 mole), N-bromosuccinimide (19.9 g., 0.112 mole) and benzoyl peroxide (1 g.) in carbon tetrachloride (500 ml.) were heated under reflux with exposure to a 750 watt lamp for 4.5 hours. The succinimide was filtered off, and the solvent removed under reduced pressure. The residue was dissolved in ether and washed with a 5% aqueous sodium bicarbonate solution. The residue obtained after drying and removal of the ether was fractionally distilled in vacuo. There was obtained 13.6 g. (48%) of 4-bromo-3-bromomethylisothiazole, B.P. 100–106° (3 mm.).

4 - bromo - 3 - cyanomethylisothiazole.—4 - bromo-3-bromomethylisothiazole (16.8 g., 0.654 mole) in dimethylsulfoxide (5 ml.) was added slowly to a stirred mixture of sodium cyanide (4 g., 0.0816 mole) and dimethylsulfoxide (20 ml.). The exothermic reaction necessitated some cooling. After one-half hour, the mixture was heated in a water bath at 40–50° for 3 hours. The reaction mixture was poured into ice-water (80 ml.), and the organic material was extracted with methylene chloride (3×50 ml.). The combined organic extracts were washed successively with 6 N hydrochloric acid (2x) and 5% aqueous sodium bicarbonate (1x). The methylene chloride solution was dried over magnesium sulfate with decolorizing carbon and filtered to give a red colored filtrate. The solvent was removed and the residue distilled in vacuo to give 3.55 g. of 4-bromo-3-cyanomethylisothiazole, B.P. 107–114° (0.5 mm.), which crystallized from benzenehexane or ether-hexane as needles (32% yield), M.P. 47–49°. The infrared spectrum agreed with the expected structure.

*Methyl 4-bromoisothiazol-3-yl-acetate.*—A mixture of 4-bromo-3-cyanomethylisothiazole (3 g., 0.015 mole), methanol (10 ml.) and concentrated hydrochloric acid (10 ml.) was heated under reflux for 44 hours, whereafter most of the methanol was removed on a rotary evaporator. Ice-water (20 ml.) was added and the organic material was taken up in methylene chloride (4×10 ml.). The combined methylene chloride solutions were dried over magnesium sulfate with some decolorizing carbon, followed by filtration. The solvent was removed and 3.3 g. (96%) of colorless liquid was obtained. The infrared spectrum agreed with the expected structure.

*4-bromoisothiazol-3-yl-acetic acid.*—Methyl 4-bromoisothiazole-3-yl-acetate (3.28 g., 0.0139 mole) was dissolved in methanol (5 ml.) and the resulting solution was treated with 3 N methanolic sodium hydroxide (5 ml.). The sodium salt of the required acid readily crystallized. The mixture was left at room temperature for one hour, then most of the methanol was removed and ether (75 ml.) was added to the residue. The sodium salt was filtered off and amounted to 2.47 g. The sodium salt (2.47 g., 0.0101 mole) was dissolved in water (10 ml.) and this solution was acidified with 6 N aqueous hydrochloric acid. The product slowly crystallized from the solution in fine white needles. The mixture was cooled and the crystals collected by filtration. The acid, M.P. 106–107°, was finally dried in vacuo over phosphorous pentoxide and amounted to 1.983 g. The infrared spectrum, neutralization equivalent and nuclear magnetic resonance spectrum fully agreed with the expected structure.

*Example 6.—Preparation of 3-methylisothiazol-4-yl-acetic acid*

*3-methylisothiazole-4-carbonyl chloride.*—3-methylisothiazole-4-carboxylic acid (7.0 g.) and thionyl chloride (30 ml.) were heated under reflux for 3 hours, whereafter the excess of thionyl chloride was removed under reduced pressure. Distillation of the residue in vacuo gave 4.5 g. (80%) of 3-methylisothiazole-4-carbonyl chloride, B.P. 64° (2 mm.).

*Methyl 3-methylisothiazol-4-yl-acetate.*—The 3-methylisothiazole-4-carbonyl chloride (4.5 g.) was added to an ice-cold solution of three equivalents of diazomethane in ether. The solution was allowed to stand overnight at room temperature. The ether was removed and methanol (275 ml.) and some silver oxide were added to the residue. The mixture was heated under reflux for 5 hours. Small amounts of silver oxide were added periodically to the refluxing mixture. The solution was filtered through "Celite," the methanol removed and the residue distilled in vacuo to give 3 g. methyl 3-methylisothiazol-4-yl-acetate (50%), B.P. 89–91° (1 mm.).

*3-methylisothiazol-4-yl-acetic acid.*—Methyl 3-methylisothiazol-4-yl-acetate (3.0 g.) was added to 3 N methanolic sodium hydroxide (10 ml.) with swirling. The solution was left overnight at room temperature and then concentrated on a rotary evaporator. The solution was then extracted with ether (3×25 ml.). The water solution was treated with charcoal, filtered through "Celite" and acidified with 3 N hydrochloric acid in an ice-water bath. The acid crystallized as a white powder and was filtered and dried in vacuo to give 2 g., M.P. 157–160°. Recrystallization from benzene gave 1.0 g. 3-methylisothiazol-4-yl-acetic acid, M.P. 159–161°. This compound had the expected neutralization equivalent, infrared spectrum and nuclear magnetic resonance spectrum.

*Example 7.—Preparation of 3-methylisothiazol-5-yl-acetic acid*

*3-methylisothiazole-5-carbonyl chloride.*—3-methylisothiazole-5-carboxylic acid (5.96 g.) and thionyl chloride (30 ml.) were heated under reflux for one and one-half hours, whereafter the excess of thionyl chloride was removed under reduced pressure. Distillation of the residue in vacuo gave 6.05 g. (93%) of 3-methylisothiazole-5-carbonyl chloride, B.P. 41–42° (0.5 mm.).

*3-methylisothiazole-5-diazomethylketone.* — The acid chloride (6.05 g.) was added slowly to an ice-cold solution of 3 equivalents of diazomethane in ether (0.24 M) and the solution was left at room temperature overnight. Ether and excess diazomethane were removed under reduced pressure and the red residue was washed with hexane, filtered and recrystallized from benzene-hexane to give 3 g. of 3-methylisothiazole-5-diazomethylketone, M.P. 84–94°, with the expected infrared spectrum.

*Ethyl 3-methylisothiazol-5-yl-acetate.*—3-methylisothiazole-5-diazomethylketone (3.0 g., 0.018 mole) and absolute ethanol (50 ml.) were heated under reflux, with magnetic stirring, in a 300 ml. round-bottom flask (the inside of which had been coated with a silver mirror). A small amount (approximately 0.3 g.) of freshly prepared silver oxide was added. This resulted in an immediate evolution of gas. This gas evolution ceased after 10–15 minutes and the addition of some more silver oxide was required. The extent of the reaction could be followed by the disappearance in the infrared spectrum of the diazo band at 2100 cm.$^{-1}$ and the appearance of an ester carbonyl band at 1740 cm.$^{-1}$. The reaction was completed after 4 hours heating under reflux, and a total amount of approximately 3.0 g. of silver oxide was added during this reflux period. The ethanol was removed on a rotary evaporator. Ether (100 ml.) was added to the residue and the suspended solid material was filtered off. The ether solution was washed with 1 N hydrochloric acid (30 ml.), and salt water, whereafter it was dried over magnesium sulfate with some decolorizing carbon. The mixture was filtered and the ether removed on a rotary evaporator, to give 1.71 g. (51%) of ethyl 3-methylisothiazol-5-yl-acetate in the form of a red oil, with the expected infrared spectrum.

*3-methylisothiazol-5-yl-acetic acid.*—3 N methanolic sodium hydroxide (3.2 ml.) was added to ethyl 3-methylisothiazol-5-yl-acetate (1.71 g., 0.00925 mole). The solution was left overnight at room temperature and concentrated in vacuo. Dry ether was added and a thick oil and some solid separated; and the solid was filtered. Both the solid and oil were washed with ether, dissolved in water (20–25 ml.) and acidified with concentrated hydrochloric acid. A dark oil separated and was extracted with ethyl acetate (6×20 ml.). The combined ethyl acetate extracts were dried over magnesium sulfate with some decolorizing carbon. The mixture was filtered, and the filtrate was concentrated on a rotary evaporator. Recrystallization of the residue from ethyl acetate-hexane gave 0.751 g. 3-methylisothiazol-5-yl-acetic acid, M.P. 135–138° (dec.). The neutralization equivalent, infrared spectrum and nuclear magnetic resonance spectrum were in agreement with the expected structure.

*Example 8*

When in the procedure of Example 6, 3-methylisothiazole-4-carboxylic acid is replaced by an equimolar amount of 4-methylisothiazole-3-carboxylic acid
5-methylisothiazole-3-carboxylic acid
4-methylisothiazole-5-carboxylic acid
3,4-dimethylisothiazole-5-carboxylic acid
4-chloro-3-methylisothiazole-5-carboxylic acid
4-iodo-3-methylisothiazole-5-carboxylic acid
4-bromo-3-methylisothiazole-5-carboxylic acid
5-methylisothiazole-4-carboxylic acid
3-chloroisothiazole-4-carboxylic acid
3-chloro-4-methylisothiazole-5-carboxylic acid
4-chloro-5-methylisothiazole-3-carboxylic acid and
3,5-dimethylisothiazole-4-carboxylic acid there are obtained 4-methylisothiazol-3-yl-acetic acid
5-methylisothiazol-3-yl-acetic acid
4-methylisothiazol-5-yl-acetic acid
3,4-dimethylisothiazol-5-yl-acetic acid
4-chloro-3-methylisothiazol-5-yl-acetic acid
4-iodo-3-methylisothiazol-5-yl-acetic acid
4-bromo-3-methylisothiazol-5-yl-acetic acid
5-methylisothiazol-4-yl-acetic acid
3-chloroisothiazol-4-yl-acetic acid
3-chloro-4-methylisothiazol-5-yl-acetic acid
4-chloro-5-methylisothiazol-3-yl-acetic acid and
3,5-dimethylisothiazol-4-yl-acetic acid respectively.

*Example 9*

When in the procedure of Example 4, 4-chloro-3-methylisothiazole is replaced by an equimolar amount of 4-iodo-3-methylisothiazole
4-chloro-5-methylisothiazole
4-bromo-5-methylisothiazole
4-iodo-5-methylisothiazole
5-bromo-3-methylisothiazole
4,5-dibromo-3-methylisothiazole
3-chloro-5-methylisothiazole
3-bromo-5-methylisothiazole and
3,4-dichloro-5-methylisothiazole there are obtained 4-iodoisothiazol-3-yl-acetic acid
4-chloroisothiazol-5-yl-acetic acid
4-bromoisothiazol-5-yl-acetic acid
4-iodoisothiazol-5-yl-acetic acid
5-bromoisothiazol-3-yl-acetic acid
4,5-dibromoisothiazol-3-yl-acetic acid
3-chloroisothiazol-5-yl-acetic acid
3-bromoisothiazol-5-yl-acetic acid and
3,4-dichloroisothiazol-5-yl-acetic acid respectively.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

What is claimed is:
1. A compound having the formula

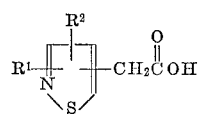

wherein R$^1$ and R$^2$ each represent a member selected from the group consisting of hydrogen, chloro, bromo, iodo and methyl.

2. A compound having the formula

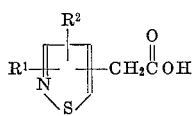

wherein R¹ and R² each represent a member selected from the group consisting of hydrogen and methyl.
3. Isothiazol-5-yl-acetic acid.
4. Isothiazol-4-yl-acetic acid.
5. Isothiazol-3-yl-acetic acid.
6. 3-methylisothiazol-5-yl-acetic acid.
7. 3-methylisothiazol-4-yl-acetic acid.
8. 4-bromoisothiazol-3-yl-acetic acid.
9. 4-chloroisothiazol-3-yl-acetic acid.
10. 4-methylisothiazol-3-yl-acetic acid.

No references cited.

ALEX MAZEL, *Primary Examiner.*
ALTON D. ROLLINS, *Assistant Examiner.*